US010887081B2

(12) United States Patent
Oberhofer et al.

(10) Patent No.: US 10,887,081 B2
(45) Date of Patent: Jan. 5, 2021

(54) AUDIT TRAIL CONFIGURATION IN A BLOCKCHAIN

(71) Applicant: International Business Machines Corporation, Armonk, NY (US)

(72) Inventors: Martin Oberhofer, Boeblingen (DE); Ivan M. Milman, Austin, TX (US); Sushain Pandit, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 16/022,438

(22) Filed: Jun. 28, 2018

(65) Prior Publication Data

US 2020/0007311 A1 Jan. 2, 2020

(51) Int. Cl.
| | |
|---|---|
| *H04L 29/06* | (2006.01) |
| *H04L 9/06* | (2006.01) |
| *G06Q 30/00* | (2012.01) |
| *G06F 21/60* | (2013.01) |
| *H04L 9/32* | (2006.01) |
| *G06F 21/62* | (2013.01) |

(52) U.S. Cl.
CPC .......... *H04L 9/0637* (2013.01); *G06F 21/602* (2013.01); *G06F 21/6218* (2013.01); *G06Q 30/018* (2013.01); *H04L 9/3297* (2013.01); *H04L 63/08* (2013.01); *H04L 63/102* (2013.01); *H04L 63/1425* (2013.01); *H04L 2209/38* (2013.01)

(58) Field of Classification Search
CPC .................... H04L 2209/38; H04L 63/1425
See application file for complete search history.

(56) References Cited

U.S. PATENT DOCUMENTS

| | | | |
|---|---|---|---|
| 9,298,806 B1 | 3/2016 | Vessenes et al. | |
| 9,635,000 B1 | 4/2017 | Muftic | |
| 10,318,747 B1 * | 6/2019 | MacCarthaigh | ...... G06F 21/602 |
| 2013/0282580 A1 | 10/2013 | O'Brien et al. | |
| 2016/0260169 A1 | 9/2016 | Arnold et al. | |
| 2016/0261690 A1 | 9/2016 | Ford | |
| 2017/0011460 A1 | 1/2017 | Molinari et al. | |
| 2017/0046651 A1 | 2/2017 | Lin et al. | |

(Continued)

FOREIGN PATENT DOCUMENTS

WO 2016186872 A1 11/2016

OTHER PUBLICATIONS

Bell et al. "Advancing open science with version control and blockchains." Proceedings of the 12th International Workshop on Software Engineering for Science. IEEE Press, 2017. (Related).

(Continued)

*Primary Examiner* — Thaddeus J Plecha

(57) ABSTRACT

An example operation may include one or more of identifying a request for a service in an enterprise network, responsive to identifying the request for the service, creating a service request message that includes user profile role information for authorization purposes, creating a blockchain transaction based on the service request message, and responsive to creation of the blockchain transaction, determining audit trail information exists based on audit trail requirements stored in a smart contract, and the audit trail information includes user profile authentication information and the user profile role information.

20 Claims, 12 Drawing Sheets

(56) References Cited

U.S. PATENT DOCUMENTS

2018/0268491 A1* 9/2018 Cuomo .............. G06Q 10/0833
2019/0080402 A1* 3/2019 Molinari ................ H04L 9/3239
2019/0333143 A1* 10/2019 Williams ............. G06Q 20/102
2019/0370358 A1* 12/2019 Nation .................. H04L 9/3247

OTHER PUBLICATIONS

Peters et al., "Understanding modern banking ledgers through blockchain technologies: Future of transaction processing and smart contracts on the internet of money." Banking Beyond Banks and Money. Springer International Publishing, 2016. 239-278. (Related).

* cited by examiner

AUDIT TRAIL CONFIGURATION IN A BLOCKCHAIN

TECHNICAL FIELD

This application generally relates to management of audit trail configurations, and more particularly, to providing audit trail capabilities for industry compliance and standards for an audit trail configuration in a blockchain.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. Blockchain is a distributed database that maintains a continuously-growing list of records in the blockchain blocks, which are secured from tampering and revision due to their immutable properties. Each block contains a timestamp and a link to a previous block. Blockchain can be used to hold, track, transfer and verify information. Since blockchain is a distributed system, before adding a transaction to the blockchain ledger, all peers need to reach a consensus status.

Conventionally, in various countries there are regulations for organizations related to audit trails that must be created and maintained for subsequent audit queries. For example, certain events (e.g., changes to privileges, transactions, etc.) in various organizations may require audit trails to be created and written to a ledger for safe and immutable recordkeeping. In some instances, those organizations may need to produce those audit trails to law enforcement or other auditors, if necessary.

Such an authentication configuration may include a user authentication, such as a username/password combination, two-factor authentication, token generators, biometric measures, etc. The parameters and metrics are managed via a lightweight directory access protocol (LDAP) system. The user roles may describe various roles a user profile may have in an enterprise environment, which are managed in an enterprise policy management system. Also, identity mediation is a type of module, which is used to correlate authentication credentials with user roles, and authorizations related to a user role are supported by backend systems, which enforce service and data authorizations that define the functions (i.e., services) and data attributes/data records/files that can be read and/or modified. Authorizations can be granted on an attribute level, a record level and/or a file level, such as access tokens, and/or by filters for a group of records.

The relationship of authentication, user roles and authorizations may be managed in a architecture context. The LDAP system configuration is used to manage authentication (username/password, etc.). The policy management system is used to manage the user roles. There is a broad range of backend systems which may be implemented, such as a master data management (MDM) system, content management systems and a relational database system. Some of the applications might be, in fact, cloud applications that support a cloud backend. The connection between service consumers and the service providers may be an enterprise services bus (ESB), which also provides API management to connect enterprise internal and external services with the service consumers. As part of the services exposed on the ESB, there is also a function implemented in the ESB which is known as identity mediation, which performs a lookup of the user roles for an authenticated service consumer before passing the service request to the backend service provider. Any particular service exposed on the ESB could also include composite services, for example, a service might retrieve a structured customer and contract data from the MDM system and the scanned contracts based on the contract IDs from the content management system. In such scenarios, a user role may map to authorizations in two or more management systems.

In some instances, employees may retire or switch companies. In such cases, authentication, user role and authorizations are dynamically revoked and/or deleted. The employees may switch roles within an enterprise which might also change user roles granted/revoked alongside certain authorizations. At a certain point in time, audit trail findings may suggest that a particular system was compromised by a disgruntled employee. A similar scenario could arise if an external attacker was able to comprise the authentication credentials of a legitimate user profile. The time required to make such findings might be hours, days, weeks, months or years after the incident occurred. In such cases, when the damage is quantified, it could be critical to understand how much data could be accessed by a user with associated user roles and who else had access to the systems, particularly users with very high privileges which are able to grant access to other users. Unfortunately, the following issues are still outstanding concerns, such as not all systems write a continuous history of the portion of the security aspect being managed (e.g., authentication, user roles and authorization details). In one example, if an employee leaves the organization, authentication, user roles and authorization details are simply deleted. At that point, it is not discoverable anymore who had access to a particular system. Such investigations have long arduous management times, even if the access data is still available in an old backup system, since it is time-consuming to install old backups and then search through them in order to identify a certain person's privileges in that particular database. Even if all the various systems write a history of all changes, if the system time zone and clock settings are not aligned it may still be impossible to figure out how the authentication and user roles aligned at a certain point in time. Those concerns make it burdensome for an enterprise to comply with regulatory requirements for audit trails.

SUMMARY

One example embodiment may provide a method that includes one or more of identifying a service request associated with a user profile for a service in an enterprise network, creating a service request message including user profile role information for authorization purposes, responsive to identifying the service request, creating a blockchain transaction based on the service request message to establish audit trail information including user profile authentication information and the user profile role information, and storing the blockchain transaction in a blockchain.

Another example embodiment may include a method that includes one or more of identifying a request for a service in an enterprise network, responsive to identifying the request for the service, creating a service request message comprising user profile role information for authorization purposes, creating a blockchain transaction based on the service request message, and responsive to creation of the blockchain transaction, determining audit trail information exists based on audit trail requirements stored in a smart contract, wherein the audit trail information includes user profile authentication information and the user profile role information.

Yet another example embodiment may include a system that includes an enterprise network, and a computing entity configured to identify a request for a service in the enterprise network, responsive to the identification of the request for the service, create a service request message which includes user profile role information for authorization purposes, create a blockchain transaction based on the service request message, and responsive to creation of the blockchain transaction, determine audit trail information exists based on audit trail requirements stored in a smart contract, and the audit trail information includes user profile authentication information and the user profile role information.

Still another example embodiment may include a non-transitory computer readable storage medium configured to store instructions that when executed cause a processor to perform one or more of identifying a request for a service in an enterprise network, responsive to identifying the request for the service, creating a service request message comprising user profile role information for authorization purposes, creating a blockchain transaction based on the service request message, and responsive to creation of the blockchain transaction, determining audit trail information exists based on audit trail requirements stored in a smart contract, wherein the audit trail information includes user profile authentication information and the user profile role information.

DETAILED DESCRIPTION

Figure 1A:
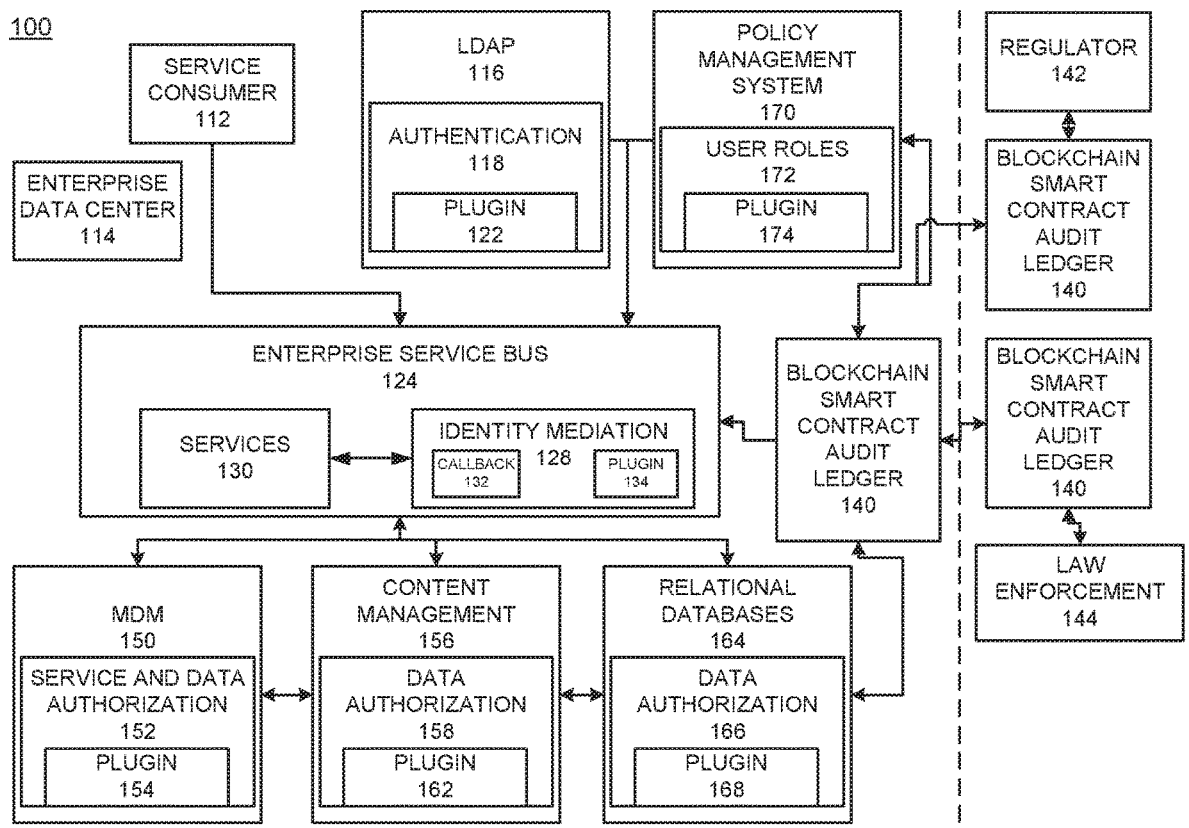
FIG. 1A illustrates a network configuration of an enterprise management system operating with a blockchain network, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, devices, networks and/or systems, which provide an audit trail transaction ledger based on a blockchain infrastructure. A blockchain 'plugin' may be implemented for the various systems maintaining audit trail relevant information. In operation, this configuration writes any 'create' or 'maintain' operation to the blockchain via the plugin service. The plugin also triggers a callback to an identity mediation module based on a ticket number provided by that module on an inbound message. In one example, a callback plugin in the identity mediation module inserts a ticket number into the service requests provided to the backend service providers, which assemble the input for a blockchain transaction which may include authentication, policy details (e.g., user roles), and authorization details received from a blockchain plugin in authorization modules of certain network components.

When implementing such a plugin blockchain interface configuration, consistent audit trail management enables enterprises to comply with regulatory needs for such audit trails. This configuration provides consistent timestamps on the blockchain based audit trail ledger, complete information at the time of execution, enables the management of authentication, policy, and authorization information, in a single location, and also provides optimal security since attackers cannot hide their access points due to the immutable nature of the blockchain transactions, and since some blockchain nodes will be external to the enterprise. Other features provide easy access for regulators, law enforcement and other interested third parties to access and identify the parties that have accessed the system without performing overburdening query audit efforts.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

FIG. 1A illustrates a network configuration of an enterprise management system operating with a blockchain network, according to example embodiments. Referring to FIG. 1A, the configuration 100 provides an architecture for enterprise blockchain information support. The components are distributed across two or more data centers, which include a mandatory enterprise data center 114 and regulator data center 142. Other enterprise data centers from partners/cloud providers may also be included as part of the backend service providers. Also, a law enforcement data center may also be present to support the law enforcement agency 144. The components may leverage a blockchain for smart contract and audit ledger compliance. In all the data centers, at least one computing node may be operating for the blockchain support to operate. The blockchain will be used as an audit ledger 140 so each transaction may be written, as outlined in a smart contract requirement representing an audit entry. In this architecture, the use cases may include support for a service consumer 112, such as creation of security relevant information, updates of security relevant information, inactivation of security relevant information, deletion of security relevant information, identity mediation, review of audit trails, etc. The use cases are based on the creation and maintenance of the security relevant artifacts, such as user names/passwords, defined user roles and specified authorization details. The blockchain plugins 122, 174, 154, 162 and 168 are included in each module or management server, such as LDAP 116 which includes authentication 118, a policy management system 170, which includes user roles 172, a MDM 150 which includes a service and data authorization component 152, a content management module 156 which includes data authorization 158 and relational databases 164 which includes data authorization 166. Whenever a security relevant segment of information is created or changed (i.e., updates, inactivation, deletion, etc.), the blockchain plugins will operate to secure an audit trail by creating blockchain transactions which are created on the blockchain audit ledger 140.

For identity mediation, an enterprise service bus 124 provides services 130 and identity mediation 128 via a callback module 132 and a plugin 134. In this example, when a service is triggered, the service must be authenticated. In the example of an MDM service request, the payload would be part of a simple object access protocol (SOAP) message header. The identity mediation module 128 includes, through performing lookup operations against the policy management system 170, the appropriate user roles by adding them to the control header structure of the message received and identified as triggering the backend service. In the example of the MDM operations, the identity mediation module 128 inserts the appropriate user roles for authorization purposes. Related to the message is also the schema definition of the message. For authorizations, it could be role-based as well as access token based. One specific approach provides injecting a ticket number in the control header structure of the message for the backend service so the ticket for the backend system would be for a callback with certain authorization details.

Figure 1B:
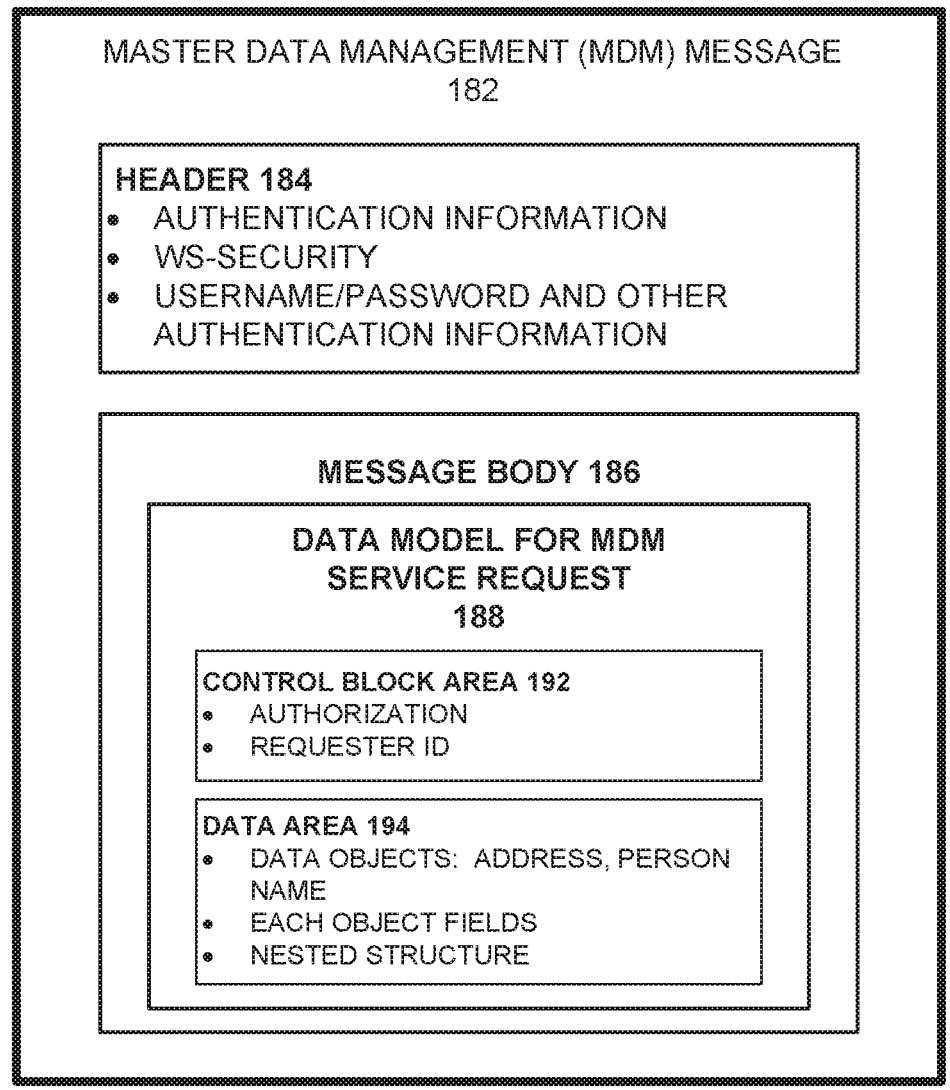
FIG. 1B illustrates an example master data management message configuration, according to example embodiments.

FIG. 1B illustrates an example master data management message configuration, according to example embodiments. Referring to FIG. 1B, example MDM configuration 180 includes an example MCM message 182 with customized information, such as user profile credentials, authorization information and other updated information in the header portion 184 of the MDM message 182, which may be created when updates occur, when the user/consumer accesses enterprise services, etc. The blockchain plugins identify the requests, changes, etc., and update the blockchain with the user profile information to ensure the audit trail is maintained as those changes occur. The message body 186 may include a data model for the MDM request 188 that includes a control block area 192 with the authorization and ID information and a data area portion 194 with data objects which identify the current status of the participants and the service information. The service request 188 may invoke a smart contract with audit trail logging and management requirements.

In an example MDM message, one requirement of the smart contract could include a new element called a "ticketNumber", which is added according to a schema definition. Once the backend system receives the message for the service request, it processes the service request as usual to provide a response message for the caller of the service. Such a response may be managed by the smart contract. In addition, in the authorization modules, enforcing the authorizations includes the ticket number for the callback, which triggers a second message to be sent to the identity mediation module 128 with the authorization details which were in place for the user roles at the time the service was called. Once the identity mediation module 128 receives the callback message with the ticket number, it assembles the required audit trail data comprised of authentication details, user roles and authorization details and uses the blockchain plugin 134 to trigger an audit trail transaction creating the appropriate audit trail entry on the blockchain as a new transaction with the new information updates each time a change is detected. The smart contact may specify that each of those information updates be included in the blockchain transaction to satisfy the audit trail requirements of that enterprise group.

The implementation of authentication, policy information, such as user roles and access tokens, as well as authorization details, are different across the various enterprise network landscapes. When attempting to create and write to an audit trail with records included in a blockchain, the information can be identified and used to trigger a mapping to a single audit transaction schema that includes, but is not limited, to a timestamp, system IDs, and payload content, which may include saving the schema per transaction alongside the schema or by inserting the information as text in a general information field. This enables a review audit scenario, subsequently, to occur where the participants on the blockchain can inspect all audit trail transactions.

Figure 2A:
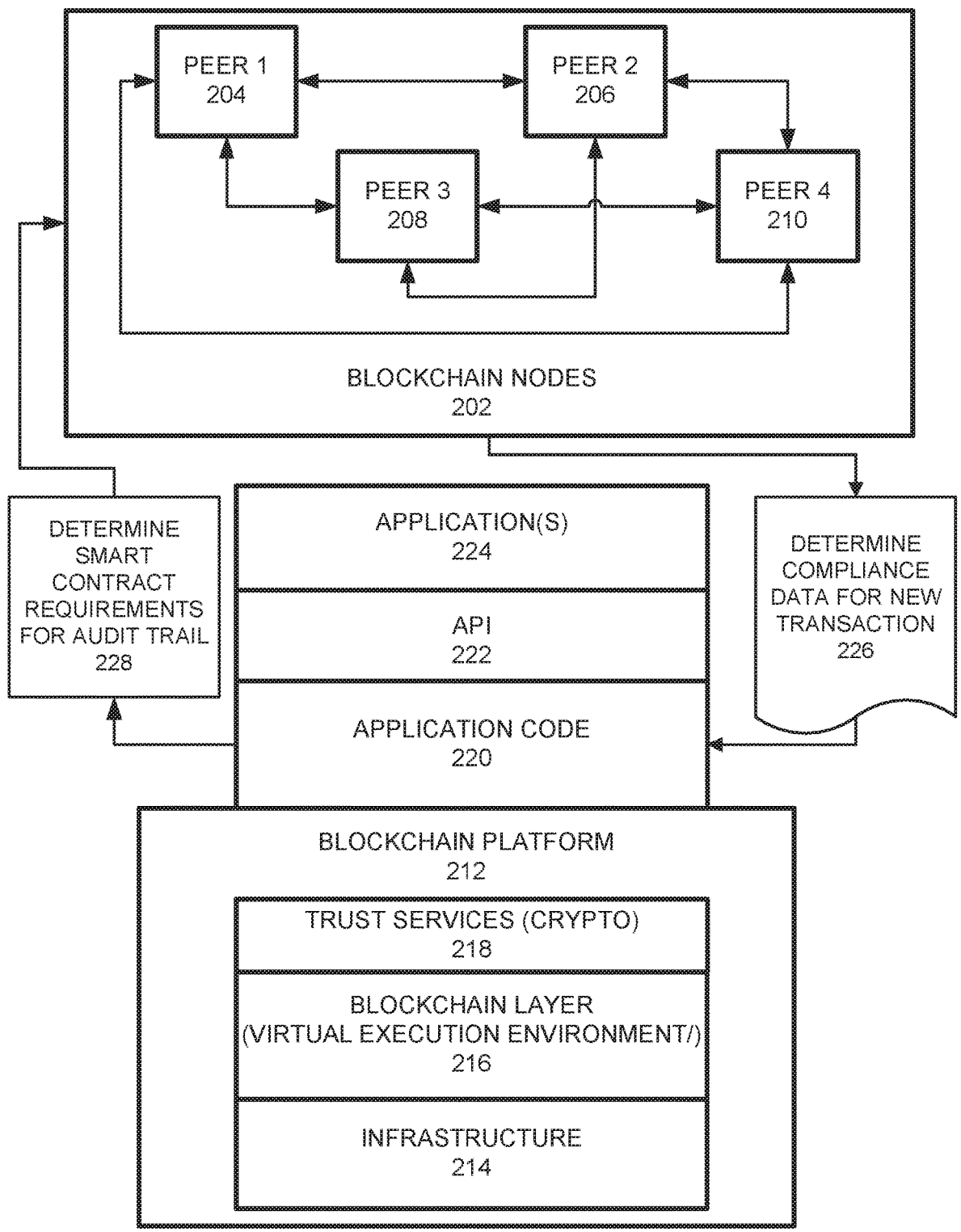
FIG. 2A illustrates an example peer node blockchain architecture configuration for performing blockchain modification operations, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (4 nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, in one example, certain appraisal data may be identified and analyzed for compliance with expected values 226. Once the information is identified and the expected values are confirmed, the smart contract requirements for the audit trail may be created 228 so the audit trail can be accurately accounted for and accessed according to certain audit trails compliance standards. The smart contract may specify the information fields required to be included in the blockchain transaction and thus the peers 202 may identify such information prior to permitting the transaction to be committed as a valid audit trail transaction. For example, the smart contract may specify user profile, authorization details, authentication details, roles, etc., all be included in the transaction as specific fields prior to consensus being reached and the transaction being committed.

Figure 2B:
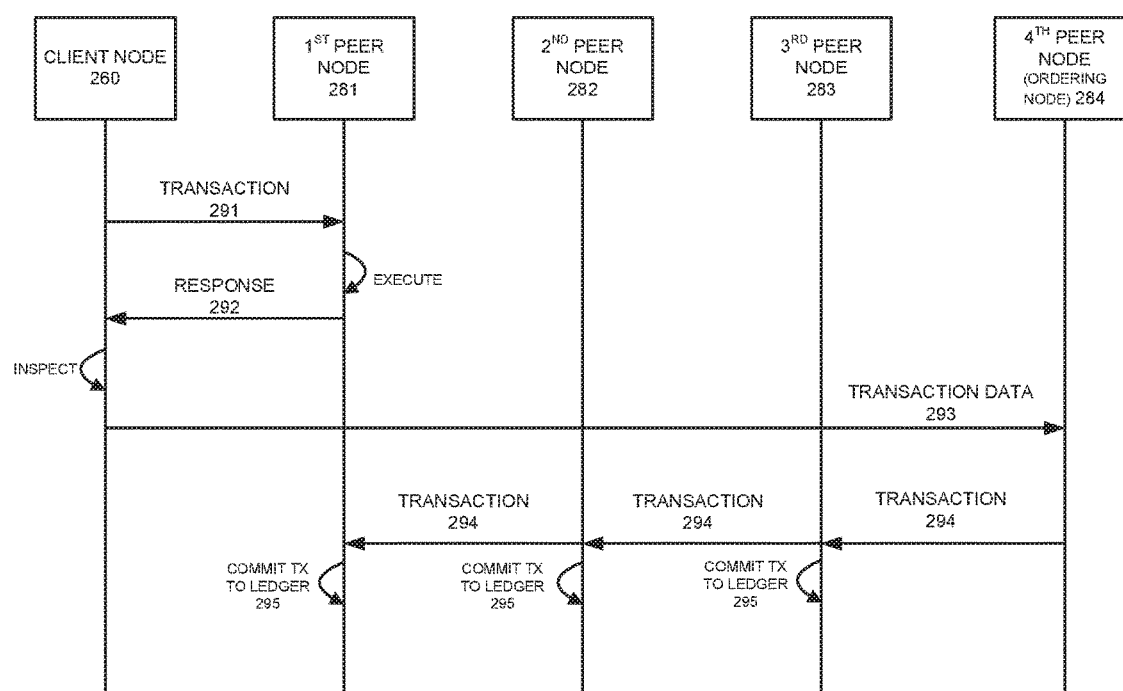
FIG. 2B illustrates an example peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
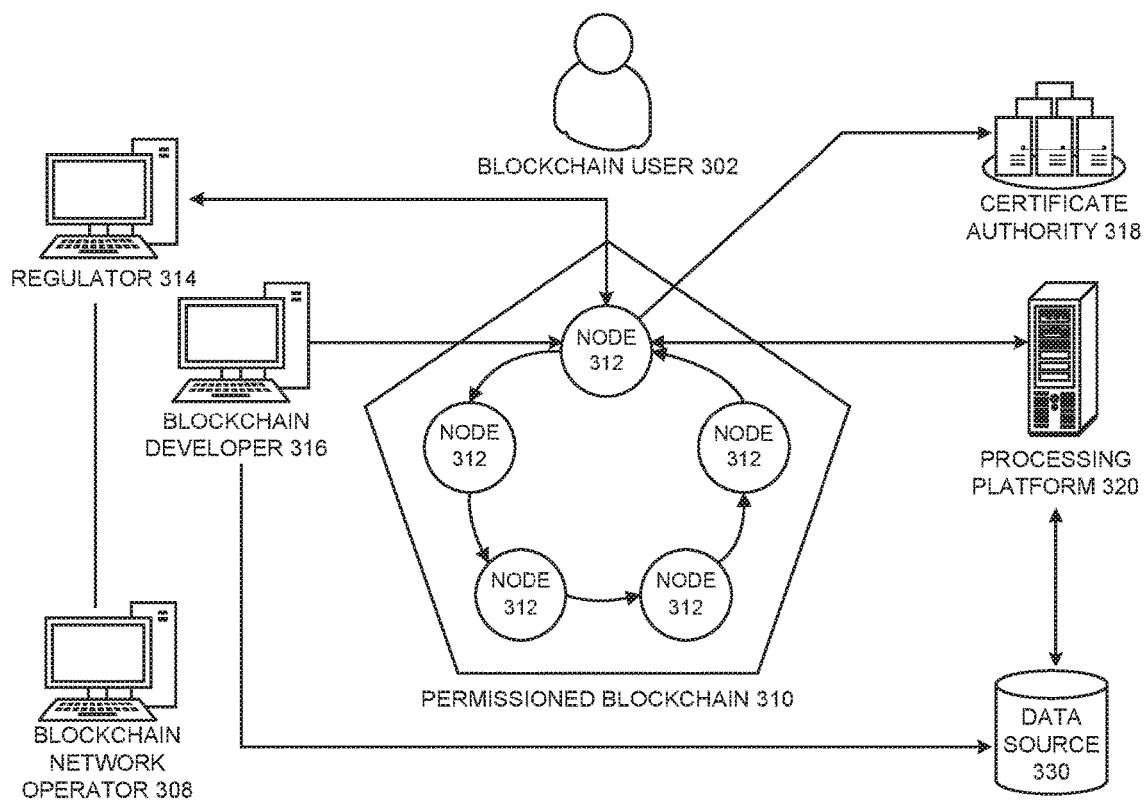
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
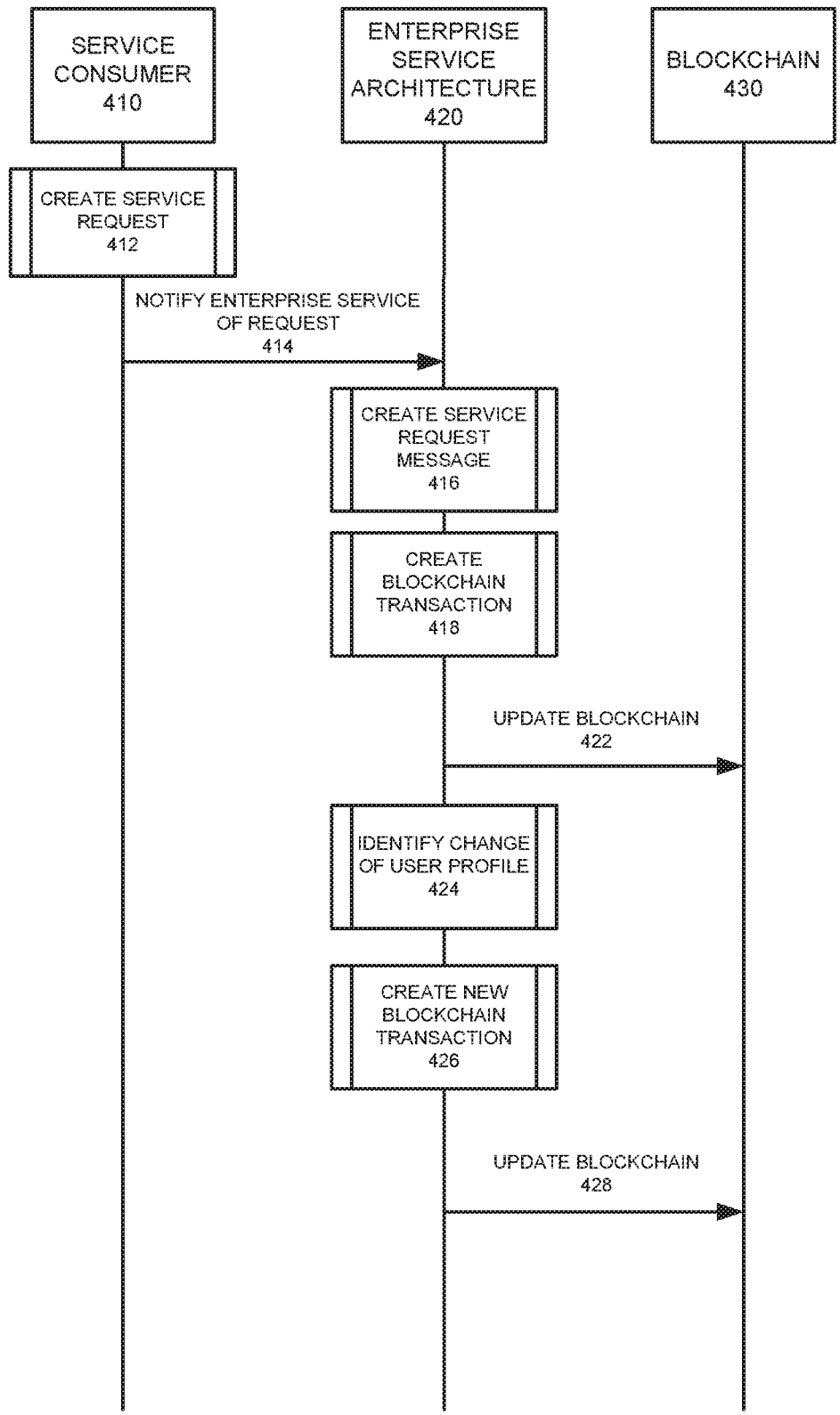
FIG. 4 illustrates a system messaging diagram for an enterprise audit trail management configuration, according to example embodiments.

FIG. 4 illustrates a system messaging diagram for an enterprise audit trail management configuration, according to example embodiments. Referring to FIG. 4, the example system configuration 400 includes a service consumer/user 410 initiating a new service request 412 for any enterprise service, such as data services, access authorization, read, write, etc. The new service request is sent 414 to the core enterprise service architecture 420 which enables a service message to be created 416. The information included in the service message may include various user identification, username, password and other related information along with the service information. A blockchain transaction may be created 418 and stored 422 to include such information in the blockchain 430 to establish the audit trail. The user profile may be changed in a subsequent operation, when the user profile linked to an employee or other member profile of the enterprise is promoted, demoted, fired, granted privileges, etc. The changes are identified 424 during update procedures and new blockchain transaction 426 may be created and stored to update 428 the blockchain 430 of the new changes.

Figure 5A:
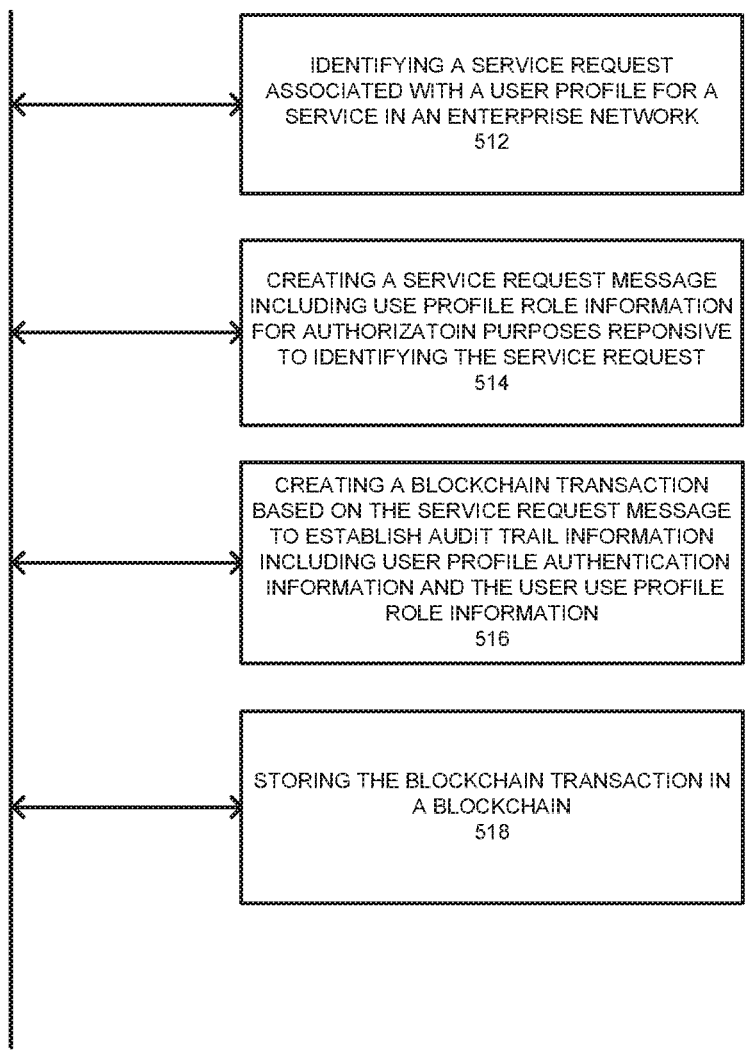
FIG. 5A illustrates a flow diagram of an example enterprise audit trail management configuration, according to example embodiments.

FIG. 5A illustrates a flow diagram of an example enterprise audit trail management configuration, according to example embodiments. Referring to FIG. 5A, the method 500 may include identifying a service request associated with a user profile for a service in an enterprise network 512, creating a service request message comprising user profile role information for authorization purposes, responsive to identifying the service request 514. The service message may identify the service requested and various user profile information needed for the audit trail. The method may also include creating a blockchain transaction based on the service request message to establish audit trail information comprising user profile authentication information and the user profile role information 516 and storing the blockchain transaction in the blockchain 518. This enables auditors to access the information and track the parties to the recent update.

The method may also include identifying a change associated with the user profile, and the change can include an update to the user profile, an inactivation of the user profile and a deletion of the user profile. The update of the user profile also includes one or more of a user profile authentication change, a user profile role change and a user profile authorization change, and the user profile role change includes one or more of an increase in data access privileges and a revocation in data access privileges. The blockchain transaction further includes a timestamp of when the service request message was created. Responsive to the change, creating a new blockchain transaction comprising the user profile role information and changes to the data access privileges.

Figure 5B:
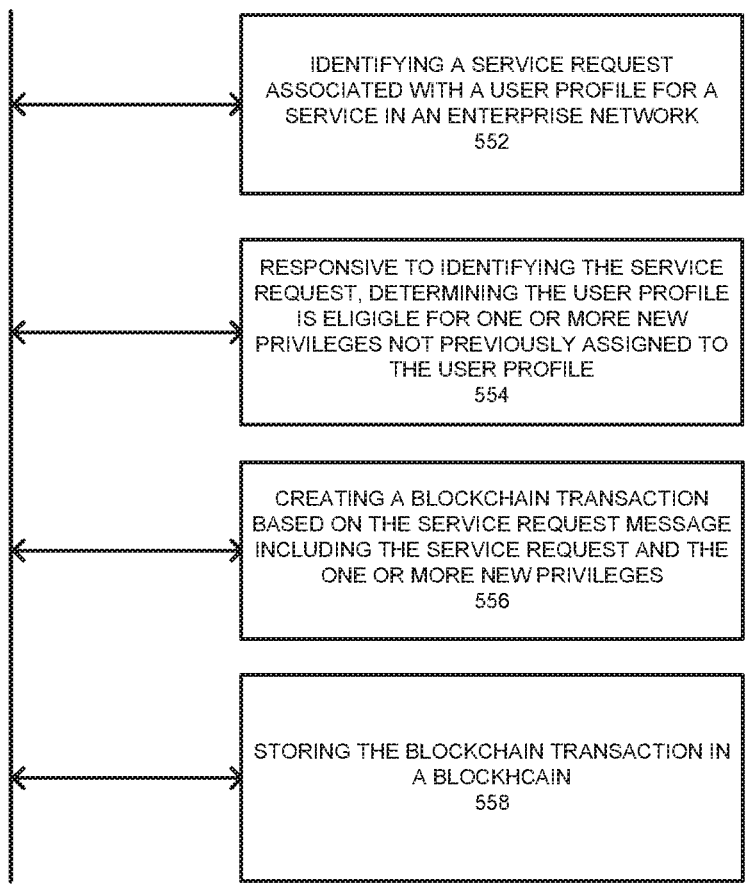
FIG. 5B illustrates a flow diagram of another example enterprise audit trail management configuration, according to example embodiments.

FIG. 5B illustrates a flow diagram of another example enterprise audit trail management configuration, according to example embodiments. Referring to FIG. 5B, the method 550 may include identifying a service request associated with a user profile for a service in an enterprise network 552, responsive to identifying the service request, determining the user profile is eligible for one or more new privileges not previously assigned to the user profile 554, creating a blockchain transaction based on the service request message comprising the service request and the one or more new privileges 556, and storing the blockchain transaction in a blockchain 558.

In addition to identifying the user profile, the service request and/or the updates to the user profile, the smart contract may identify a new privilege that user profile is entitled to receive. For example, the user profile may not be eligible to access certain secure data environments not previously available to the user profile due to a previous user role (i.e., promotion to manager). The service request may include the user role information as the user profile has been recently upgraded/promoted from a previous user role. The service request may include the new upgraded status which is logged in the blockchain as a transaction that reflects the upgrade in the user profile's new role and the corresponding status changes, such as the new privileges linked to the new role.

Figure 5C:
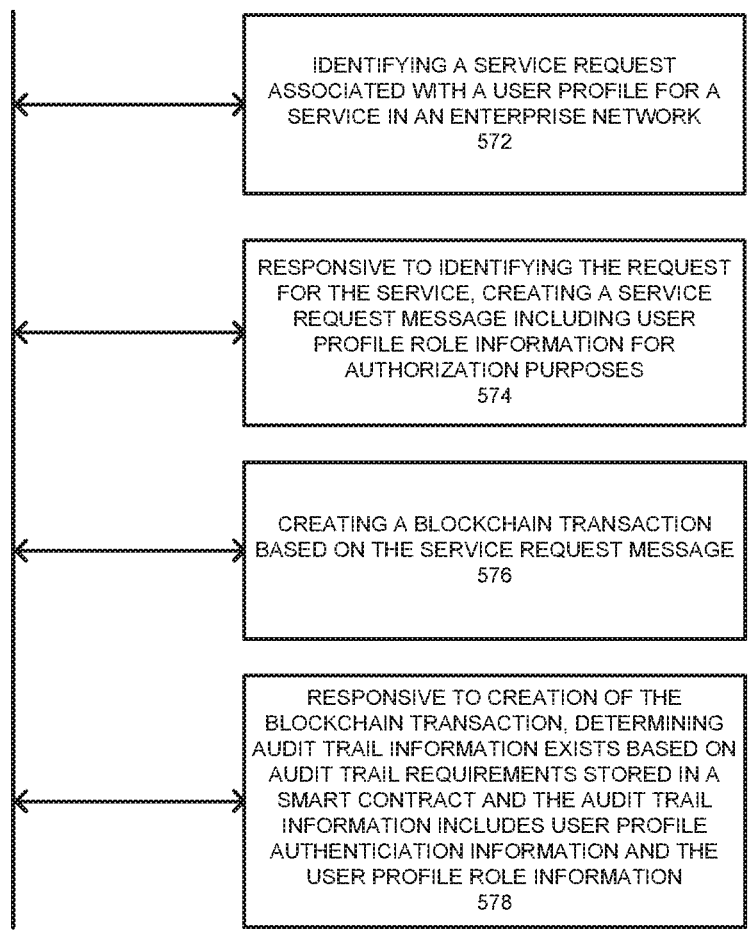
FIG. 5C illustrates a flow diagram of yet another example enterprise audit trail management configuration, according to example embodiments.

FIG. 5C illustrates a flow diagram of yet another example enterprise audit trail management configuration, according to example embodiments. Referring to FIG. 5C, the example method 570 may include identifying a request for a service in an enterprise network 572, responsive to identifying the request for the service, creating a service request message including user profile role information for authorization purposes 574, creating a blockchain transaction based on the service request message 576, and responsive to creation of the blockchain transaction, determining audit trail information exists based on audit trail requirements stored in a smart contract, and the audit trail information includes user profile authentication information and the user profile role information 578.

Another example embodiment may include a system that includes an enterprise network, and a computing entity configured to identify a request for a service in the enterprise network, responsive to the identification of the request for the service, create a service request message which includes user profile role information for authorization purposes, create a blockchain transaction based on the service request message, and responsive to creation of the blockchain transaction, determine audit trail information exists based on audit trail requirements stored in a smart contract, and the audit trail information also includes user profile authentication information and the user profile role information.

In the message and schema creation procedures performed to satisfy the audit the trail requirements, an example message provides:

```
<?xml version="1.0" encoding="UTF-8"?>
<!DOCTYPE TCRMService SYSTEM "myTCRM.dtd">
<TCRMService>
    <RequestControl>
        <requestID>100020</requestID>
        <DWLControl>
            <requesterName>cusadmin</requesterName>
            <requesterLanguage>100</requesterLanguage>
            <company>1141137166</company>
            <userRole>FA</userRole>
            <ticketNumber>23435343</ticketnumber>
        </DWLControl>
    </RequestControl>
    <TCRMTx>
        <TCRMTxType>addPerson</TCRMTxType>
        <TCRMTxObject>TCRMPersonBObj</TCRMTxObject>
        <TCRMObject>
            <TCRMPersonBObj>
                <PartyId/>.
```

An example schema provides:

```
DWLControl - (request)
<xsd:element name="DWLControl">
<xsd:complexType>
<xsd:sequence>
        <xsd:element ref="requesterName"/>
        <xsd:element minOccurs="0" ref="requesterLanguage"/>
        <xsd:element minOccurs="0" ref="requesterLocale"/>
        <xsd:element minOccurs="0" ref="requestTime"/>
        <xsd:element minOccurs="0" ref="customerRequestVersion"/>
        <xsd:element minOccurs="0" ref="customerEnvironment"/>
        <xsd:element minOccurs="0" ref="lineOfBusiness"/>
        <xsd:element minOccurs="0" ref="company"/>
        <xsd:element minOccurs="0" ref="geographicalRegion"/>
        <xsd:element minOccurs="0" ref="transactionCorrelatorId"/>
    <xsd:element minOccurs="0" ref="clientTransactionName"/>
        <xsd:element minOccurs="0" ref="clientSystemName"/>
        <xsd:element minOccurs="0" ref="inquireAsOfDate"/>
        <xsd:element minOccurs="0" ref="inquireFromDate"/>
        <xsd:element minOccurs="0" ref="inquireToDate"/>
        <xsd:element minOccurs="0" ref="sessionId"/>
        <xsd:element minOccurs="0" ref="updateMethodCode"/>
        <xsd:element minOccurs="0" ref="requestOrigin"/>
        <xsd:element minOccurs="0" ref="userPassword"/>
        <xsd:element minOccurs="0" ref="securityToken"/>
        <xsd:element minOccurs="0" ref="encryptionType"/>
        <xsd:element maxOccurs="unbounded" minOccurs="0" ref="userRole"/>
        <xsd:elementmaxOccurs="1" minOccurs="0" ref="accessTokenCollection"/>
    <xsd:element maxOccurs="1" minOccurs="1" ref="ticketNumber"/>
        <xsd:elementmaxOccurs="1" minOccurs="0" ref="pageStartIndex"/>
        <xsd:elementmaxOccurs="1" minOccurs="0" ref="pageEndIndex"/>
        <xsd:elementmaxOccurs="1" minOccurs="0" ref="returnAvailableResultCount"/>
        <xsd:element       maxOccurs="unbounded"       minOccurs="0"
ref="ControlExtensionProperty"/>
</xsd:sequence>
</xsd:complexType>
</xsd:element>.
```

Figure 6A:
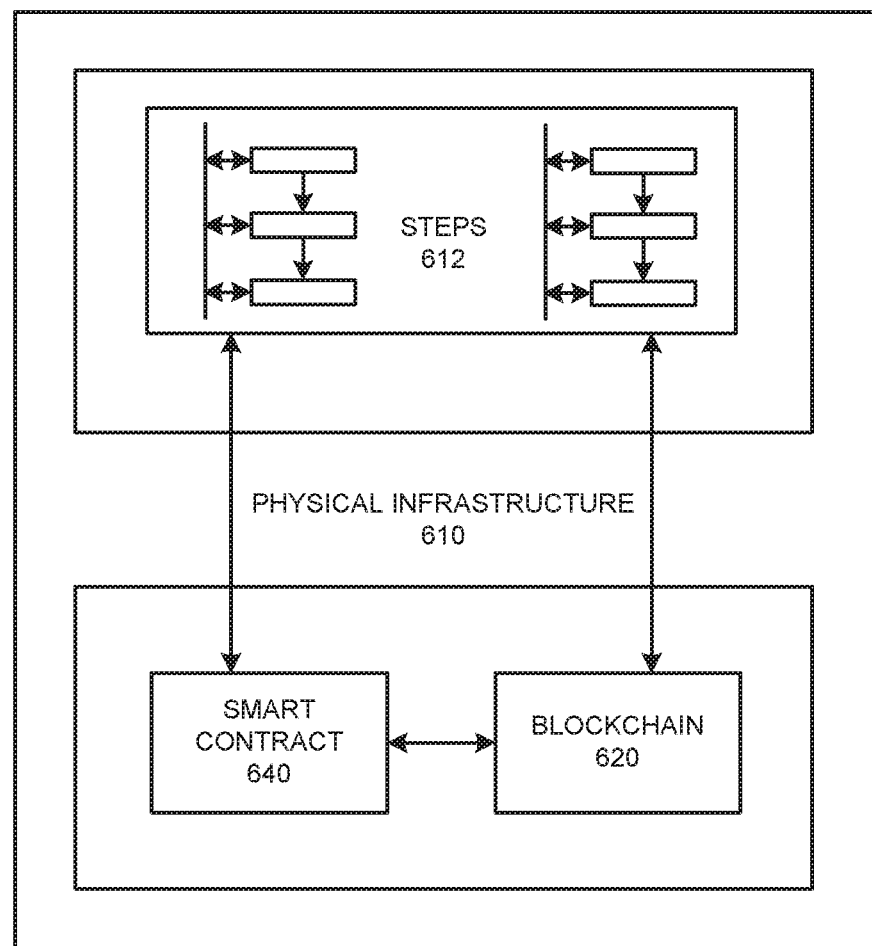
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600 includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
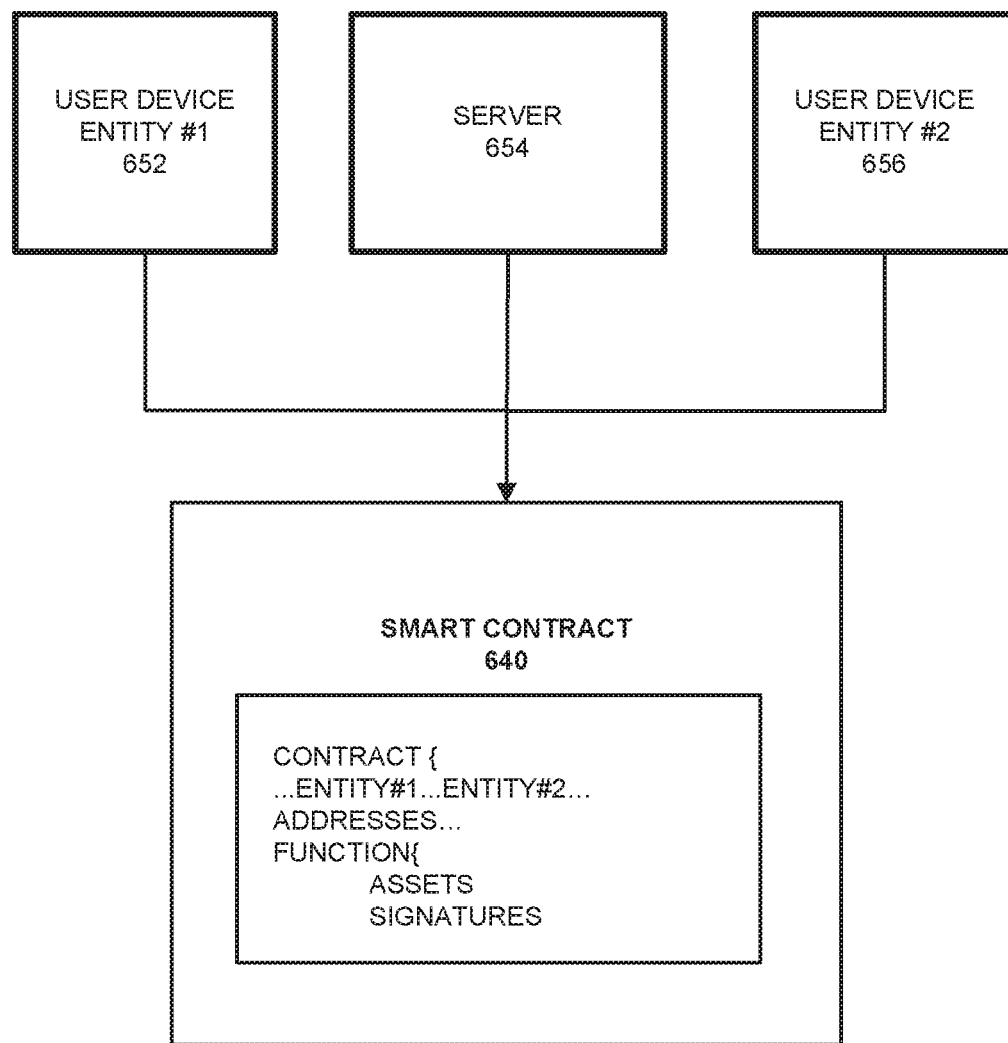
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650 may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
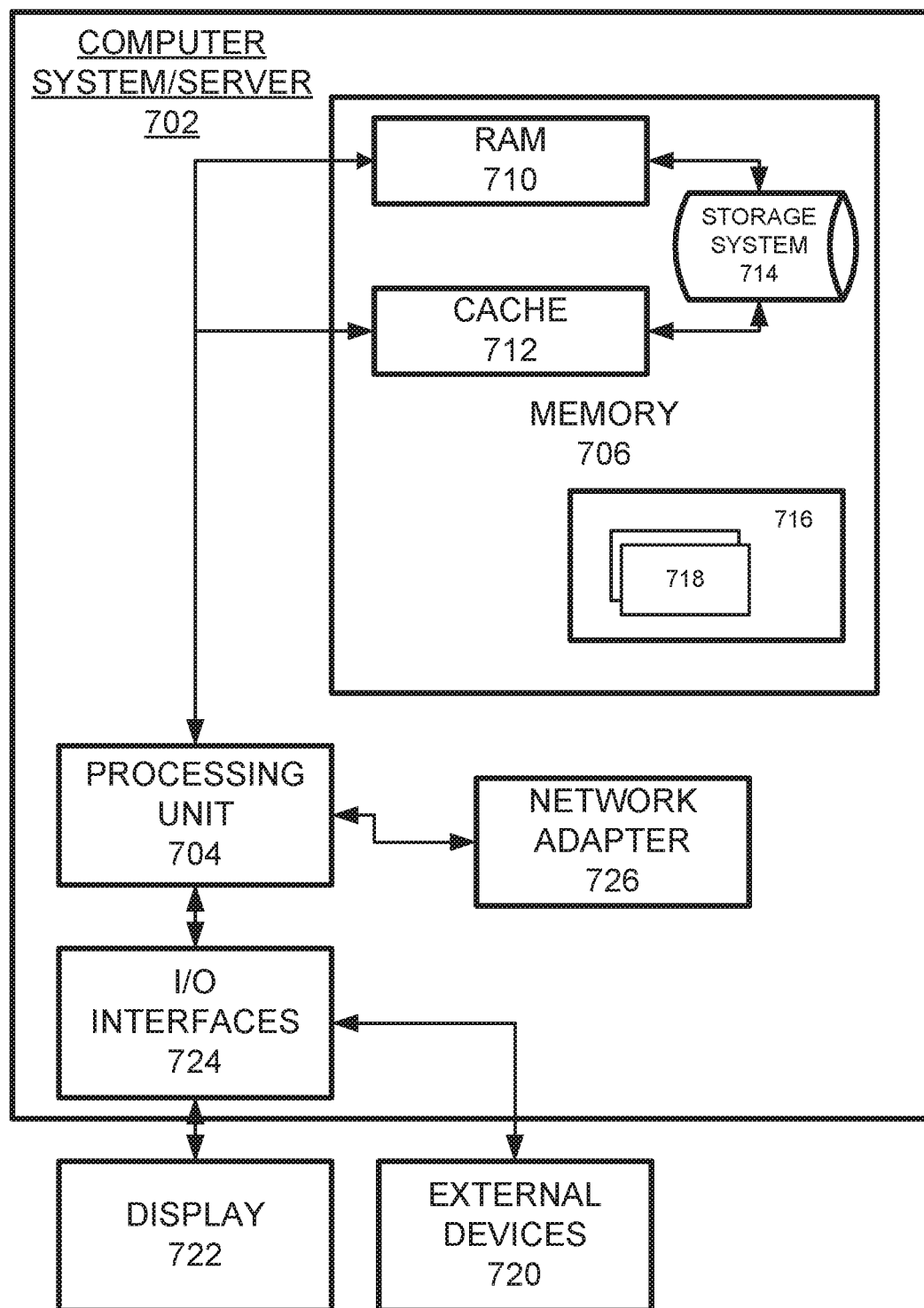
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   identifying a request for a service in an enterprise network;
   creating a service request message based on the request, the service request message comprising user profile role information for authorization purposes;
   creating a blockchain transaction based on the service request message, the creating comprising storing audit trail information within the blockchain transaction from the service request message based on audit trail requirements stored in a smart contract, wherein the audit trail information comprises user profile authentication information and the user profile role information; and
   storing the blockchain transaction on a blockchain.

2. The method of claim 1, further comprising:
   identifying a change associated with a user profile role and storing information about the change within the blockchain transaction.

3. The method of claim 2, wherein the change comprises one or more of an update to a user profile, an inactivation of the user profile, and a deletion of the user profile.

4. The method of claim 2, wherein the change comprises one or more of a user profile authentication change, a user profile role change, and a user profile authorization change.

5. The method of claim 4, wherein the user profile role change comprises one or more of an increase in data access privileges and a revocation in data access privileges.

6. The method of claim 1, wherein the blockchain transaction further comprises a timestamp of when the service request message was created.

7. The method of claim 1, wherein the creating comprises creating the blockchain transaction comprising updated user profile role information and changes to data access privileges, in response to the updated user profile role information and changes to the data access privileges being included in the service request message.

8. A system, comprising:
a hardware processor configured to
identify a request for a service in an enterprise network;
create a service request message which comprises user profile role information for authorization purposes;
create a blockchain transaction based on the service request message, the creating comprising storing audit trail information within the blockchain transaction from the service request message based on audit trail requirements stored in a smart contract, wherein the audit trail information comprises user profile authentication information and the user profile role information and
store the blockchain transaction on a blockchain.

9. The system of claim 8, wherein the processor is further configured to identify a change associated with a user profile role and store information about the change within the blockchain transaction.

10. The system of claim 9, wherein the change comprises one or more of an update to a user profile, an inactivation of the user profile and a deletion of the user profile.

11. The system of claim 9, wherein the change comprises one or more of a user profile authentication change, a user profile role change and a user profile authorization change.

12. The system of claim 11, wherein the user profile role change comprises one or more of an increase in data access privileges and a revocation in data access privileges.

13. The system of claim 8, wherein the blockchain transaction further comprises a timestamp of when the service request message was created.

14. The system of claim 12, wherein the processor is configured to create the blockchain transaction which comprises updated user profile role information and changes to data access privileges, in response to the updated user profile role information and changes to the data access privileges being included in the service request message.

15. A non-transitory computer readable storage medium that stores instructions that when executed cause a processor to perform a method comprising:
identifying a request for a service in an enterprise network;
creating a service request message comprising user profile role information for authorization purposes;
creating a blockchain transaction based on the service request message, the creating comprising storing audit trail information within the blockchain transaction from the service request message based on audit trail requirements stored in a smart contract, wherein the audit trail information comprises user profile authentication information and the user profile role information; and
storing the blockchain transaction on a blockchain.

16. The non-transitory computer readable storage medium of claim 15, wherein the method further comprises:
identifying a change associated with a user profile role and storing information about the change within the blockchain transaction.

17. The non-transitory computer readable storage medium of claim 16, wherein the change comprises one or more of an update to a user profile, an inactivation of the user profile and a deletion of the user profile.

18. The non-transitory computer readable storage medium of claim 16, wherein the change comprises one or more of a user profile authentication change, a user profile role change and a user profile authorization change.

19. The non-transitory computer readable storage medium of claim 18, wherein the user profile role change comprises one or more of an increase in data access privileges and a revocation in data access privileges, and responsive to the user profile role change, the creating comprises creating the blockchain transaction comprising updated user profile role information and the changes to the data access privileges.

20. The non-transitory computer readable storage medium of claim 15, wherein the blockchain transaction further comprises a timestamp of when the service request message was created.

* * * * *